(12) United States Patent
Yang et al.

(10) Patent No.: US 10,148,779 B2
(45) Date of Patent: Dec. 4, 2018

(54) CENTRALIZED LOCATION CONTROL SERVER

(71) Applicant: Telefonaktiebolaget LM Ericsson (publ), Stockholm (SE)

(72) Inventors: Yong Yang, Kållered (SE); Lars-Bertil Olsson, Angered (SE); Lars Lövsén, Göteborg (SE); Roland Gustafsson, Bengtsfors (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/517,392

(22) PCT Filed: Nov. 10, 2014

(86) PCT No.: PCT/EP2014/074195
§ 371 (c)(1),
(2) Date: Apr. 6, 2017

(87) PCT Pub. No.: WO2016/074700
PCT Pub. Date: May 19, 2016

(65) Prior Publication Data
US 2017/0302751 A1    Oct. 19, 2017

(51) Int. Cl.
*H04W 76/10*        (2018.01)
*H04L 29/08*        (2006.01)
(Continued)

(52) U.S. Cl.
CPC .......... *H04L 67/28* (2013.01); *H04L 12/1407* (2013.01); *H04L 65/105* (2013.01);
(Continued)

(58) Field of Classification Search
CPC .............................. H04W 64/00; H04L 67/28
(Continued)

(56) References Cited

U.S. PATENT DOCUMENTS

2012/0015666 A1* 1/2012 Horn ................... H04L 45/021
455/456.1
2012/0054172 A1* 3/2012 Agrawal ................ H04W 4/18
707/713

OTHER PUBLICATIONS

Author Unknown, "Technical Specification Group Services and System Aspects; Study on Core Network Overload (CNO) solutions (Release 12)," Technical Report 23.843, Version 12.0.0, 3GPP Organizational Partners, Dec. 2013, 48 pages.
(Continued)

*Primary Examiner* — Michael T Vu
(74) *Attorney, Agent, or Firm* — Withrow & Terranova, PLLC

(57) ABSTRACT

An intermediate network node manages location data of mobile terminals in a wireless communication network and includes a processing unit and a memory, which contains instructions executable by the processing unit, whereby the network node is operative to establish connection with one or more mobility management nodes in the network, establish connection with any one of network nodes requesting location data indicating the location of at least one mobile terminal, receive a request for the location data indicating the location of the at least one mobile terminal from a requesting network node of said network nodes, obtain a set of location information indicating the location of the at least one mobile terminal from at least one of the mobility management nodes, produce the requested location data from the obtained set of location information, and provide the produced location data to the requesting network node of said network nodes.

19 Claims, 11 Drawing Sheets

(51) Int. Cl.
  H04L 12/14     (2006.01)
  H04M 15/00    (2006.01)
  H04W 4/02     (2018.01)
  H04W 4/24     (2018.01)
  H04W 8/08     (2009.01)
  H04W 64/00    (2009.01)
  H04L 29/06    (2006.01)
  H04L 12/24    (2006.01)
  H04W 88/14    (2009.01)
  H04W 88/18    (2009.01)

(52) U.S. Cl.
  CPC ....... *H04M 15/66* (2013.01); *H04M 15/8033* (2013.01); *H04W 4/02* (2013.01); *H04W 4/24* (2013.01); *H04W 8/08* (2013.01); *H04W 64/003* (2013.01); *H04W 76/10* (2018.02); *H04L 41/0609* (2013.01); *H04L 41/0613* (2013.01); *H04L 41/0618* (2013.01); *H04L 41/0622* (2013.01); *H04L 65/1016* (2013.01); *H04L 67/26* (2013.01); *H04L 67/288* (2013.01); *H04L 67/2833* (2013.01); *H04L 67/2842* (2013.01); *H04W 88/14* (2013.01); *H04W 88/182* (2013.01)

(58) Field of Classification Search
  USPC .............................................. 455/456–456.6
  See application file for complete search history.

(56) References Cited

OTHER PUBLICATIONS

Author Unknown, "Technical Specification Group Services and System Aspects; Network architecture (Release 13)," Technical Specification 23.002, Version 13.0.0, 3GPP Organizational Partners, Sep. 2014, 109 pages.

Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.

Author Unknown, "Technical Specification Group Services and System Aspects; Functional stage 2 description of Location Services (LCS) (Release 12)," Technical Specification 23.271, Version 12.0.0, 3GPP Organizational Partners, Dec. 2013, 169 pages.

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.2.0, 3GPP Organizational Partners, Sep. 2013, 293 pages.

Author Unknown, "Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 12)," Technical Specification 29.172, Version 12.4.0, 3GPP Organizational Partners, Mar. 2014, 38 pages.

Author Unknown, "Technical Specification Group Services and System Aspects; Telecommunication management; Charging management; Charging Data Record (CDR) transfer (Release 12)," Technical Specification 32.295, Version 12.0.0, 3GPP Organizational Partners, Sep. 2013, 32 pages.

Muscetra, Flavio, "A Smart Approach to Signalling Challenges on the Road to LTE," (jinny)™ Powering Mobile Evolution, XP055201399, Jul. 22, 2014, Jinny Software Ltd., pp. 1-12.

Nortel Networks, "R3-051154: [Draft] MM-Entity Definition for LTE/SAE," TSG-RAN Working Group 3 meeting #48bis, Oct. 11-14, 2005, 2 pages, Cannes, France.

International Search Report and Written Opinion for International Patent Application No. PCT/EP2014/074195, dated Oct. 13, 2015, 21 pages.

\* cited by examiner

CENTRALIZED LOCATION CONTROL SERVER

This application is a 35 U.S.C. § 371 national phase filing of International Application No. PCT/EP2014/074195, filed Nov. 10, 2014, the disclosure of which is incorporated herein by reference in its entirety.

TECHNICAL FIELD

The invention relates to a method of managing location data of mobile terminals in a wireless communication network and an intermediate network node performing the method. The invention further relates to a computer program performing the method according to the present invention, and a computer program product comprising computer readable medium having the computer program embodied therein.

BACKGROUND

Location based policy and/or charging control as well as location based services (LBSs) are ever-increasingly popular for mobile terminals such as User Equipment (UE) in wireless communication networks, and provide enormous value to both telecom operators, 3rd party service providers and also to end-users. However, mechanisms to report User Location Information (ULI) or similar location data for mobile terminals are scattered across different communication paths, which creates a complex set-up for network entities to report, collect, and process such information. Further, in existing deployments, when location requests are performed by the various entities for UEs, sever congestion can occur in core network nodes.

Location dependent charging was introduced in 3rd Generation Partnership Project (3GPP) technology for General Packet Radio Service (GPRS) access in Global System for Mobile communications (GSM), and subsequently for Long Term Evolution (LTE) network access, where mobility management nodes, e.g. a Mobility Management Entity (MME) and/or a Serving General Packet Service Support Node (SGSN), report any change in UE location or similar location data when such report is subscribed by a node such as for instance a Policy and Charging Rules Function (PCRF), a Packet Data Network Gateway (PGW), a Gateway General Packet Service Support Node (GGSN), etc.

Further, to facilitate Internet Protocol Multimedia Subsystem (IMS) services, the mobility management nodes shall provide current UE location or similar location data during any session management signalling when the UE is in 3GPP access, which typically is requested by a so called Proxy-Call Session Control Function (P-CSCF).

Recently, user location reporting or reporting of similar location data is enhanced with introducing Presence Reporting Area concept, where the mobility management nodes shall report to the PCRF/PGW when UE changes presence (i.e. enters/leaves) the Presence Reporting Area. The Presence Reporting Area is an area defined within the 3GPP Packet Domain for the purposes of reporting of UE presence within that area due to policy control and/or charging reasons.

In the location reporting mechanism in the art, the reporting is undertaken per UE and Packet Data Network (PDN) connection, which imposes a tremendous amount of signalling over the packet core network. In addition, different network entities, e.g. PCRF, P-CSCF, Gateway Mobile Location Centre (GMLC), etc., use different mechanisms, different signalling paths, and different signalling procedures to request the mobility management nodes to report UE location, and the implication of the requests may change when the UE changes its location, which adds more signalling and processing load in the core network nodes. There is thus a need to improve the approach of performing UE location in the art.

SUMMARY

An object of the present invention is to solve, or at least mitigate, these problems in that art and thus to provide an improved method and network node for managing mobile terminal location data This object is attained in a first aspect of the present invention by an intermediate network node configured to manage location data of mobile terminals in a wireless communication network. The intermediate network node further is configured to establish connection with one or more mobility management nodes in the network and to establish connection with any one of network nodes requesting location data indicating the location of at least one mobile terminal. The intermediate network node is further configured to receive a request for the location data indicating the location of the at least one mobile terminal from a requesting network node of the network nodes and obtain a set of location information indicating the location of the at least one mobile terminal from at least one of the mobility management nodes. Moreover, the intermediate network node is configured to produce the requested location data from the obtained set of location information and to provide the produced location data to the requesting network node of the network nodes.

This object is attained in a second aspect by a method at an intermediate network node of managing location data of mobile terminals in a wireless communication network. The method comprises establishing connection with one or more mobility management nodes in the network, establishing connection with any one of network nodes requesting location data indicating the location of at least one mobile terminal, and receiving a request for the location data indicating the location of the at least one mobile terminal from a requesting network node of the network nodes. Further, the method comprises obtaining a set of location information indicating the location of the at least one mobile terminal from at least one of the mobility management nodes, producing the requested location data from the obtained set of location information, and providing the produced location data to the requesting network node of the network nodes.

Advantageously, the intermediate network node according to an embodiment of the present invention, which node will be referred to in the following as a Centralized Location Central Server (CLCS), is configured to establish a connection in a packet core network with any network node that may request location information. The CLCS is further configured to establish a connection with one or more mobility management nodes in the network, via which the mobile terminal location data enters the packet core network.

In the art, a mobility management node (such as an MME or an SGSN) would provide a network node requesting mobile terminal location data (such as a PCRF) via a Serving Gateway (SGW) and a PGW, which causes a great load on the MME/SGSN and particularly on the SGW and the PGW. Assuming for instance that a mobile terminal establishes a number of PDN connections with the packet core network (e.g. three); three communication paths will thus traverse across the MME, SGW and PGW and finally terminate at the PCRF, given that it is the PCRF that requests the mobile terminal location data. Hence, there is one signaling relation per PDN connection and mobile terminal.

Further, if other location data-requesting nodes are to be provided with mobile terminal location data, such as an Application Function (AF), being connected to the PCRF, the traffic would further have to traverse the PCRF to reach the AF, thereby also creating a great deal of traffic in the PCRF. In another example, if a location data-requesting node such as a Gateway Mobile Location Centre (GMLC) is to be provided with mobile terminal location data, the GMLC would be provided with the location data directly from the MME. The MME, which is a highly loaded node in terms of network traffic, would have to manage various requests of different formats and requesting different types of location data, thus allocating resources for receiving, handling and processing requests, and finally providing the requested location data to one or more requesting nodes.

With the CLCS, any requesting network node, such as a GMLC, a PCRF, an Online Charging System (OCS), a P-CSCF, an Internet application server, etc., can be connected to and served with requested mobile terminal location data obtained from any one or more appropriate mobility managements nodes, such as an MME, an SGSN, a Trusted Wireless Access Gateway (TWAG), an Evolved Packet Data Gateway (ePDG), a Mobile Switching Center (MSC), etc., with which the CLCS is configured to connect and via which the mobile terminal location data enters the packet core network.

Advantageously, upon receiving a request from e.g. a PCRF for location data indicating the location of one or more mobile terminals, the CLCS turns to the appropriate mobility management node(s) in order to obtain a set of location information indicating the location the mobile terminal. Typically, the CLCS needs to gather a plurality of location information data quantities from one or more mobility management nodes and produce the requested location data from the gathered data quantities in terms of extracting appropriate data, processing the data to accomplish the requested location data. Finally, the CLCS provides the produced location data to the requesting node. This will greatly reduce the signalling load on many of the existing nodes in the packet core network.

Further provided is a computer program performing the method according to the present invention, and a computer program product comprising computer readable medium having the computer program embodied therein. Preferred embodiments of the present invention will be further discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
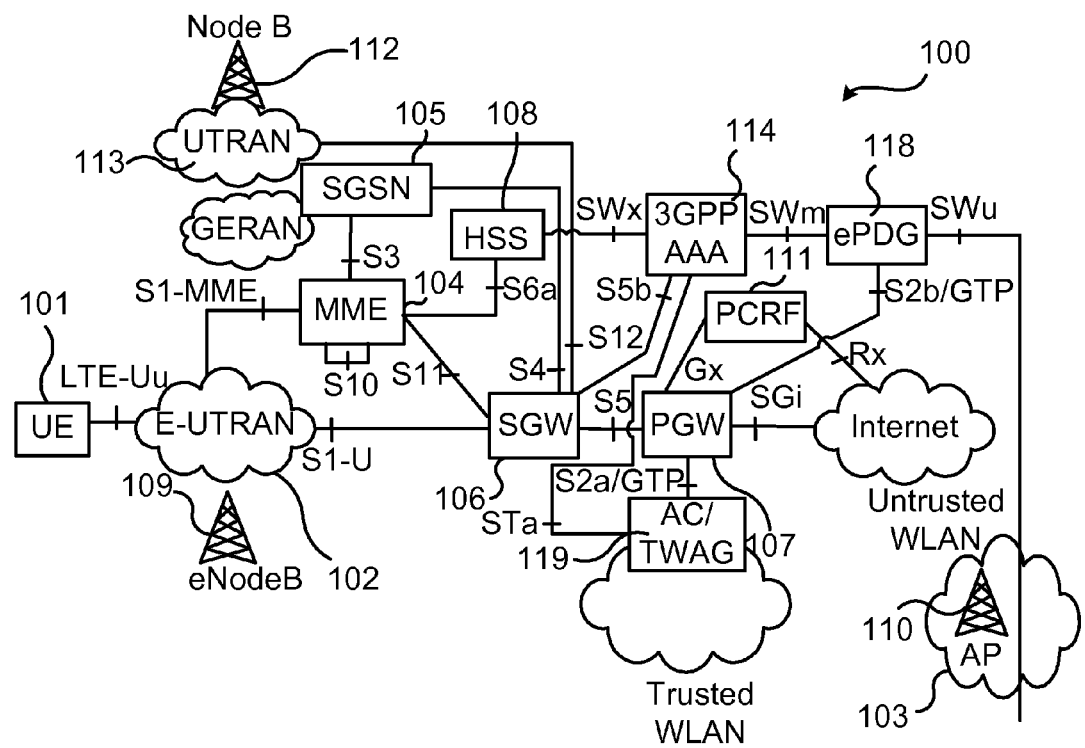
FIG. 1 shows a schematic overview of an exemplifying wireless communication system in which the present invention can be implemented.

FIG. 1 shows a schematic overview of an exemplifying wireless communication system 100 in which the present invention can be implemented. The wireless communication system 100 is an LTE based system. It should be pointed out that the terms "LTE" and "LTE based" system is here used to comprise both present and future LTE based systems, such as, for example, advanced LTE systems. It should be appreciated that although FIG. 1 shows a wireless communication system 100 in the form of an LTE based system, the example embodiments herein may also be utilized in connection with other wireless communication systems, such as e.g. Global System for Mobile Communications (GSM) or Universal Mobile Telecommunication System (UMTS), comprising nodes and functions that correspond to the nodes and functions of the system in FIG. 1.

The wireless communication system 100 comprises one or more base stations in the form of eNodeBs 109, operatively connected to a Serving Gateway (SGW) 106, in turn operatively connected to a Mobility Management Entity (MME) and a Packet Data Network Gateway (PGW) 107, which in turn is operatively connected to a Policy and Charging Rules Function (PCRF) 111. The eNodeB 109 is a radio access node that interfaces with a mobile radio terminal 101, e.g. a UE. The eNodeB 109 of the system forms the radio access network called Evolved Universal Terrestrial Radio Access Network (E-UTRAN) 102 for LTE communicating with the UE 101 over an air interface such as LTE-Uu. The core network in LTE is known as Evolved Packet Core (EPC), and the EPC together with the E-UTRAN 102 is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE 101, and further manages and stores UE contexts, e.g. parameters of the IP bearer service, network internal routing information. It also performs replication of the user traffic in case of lawful interception. The SGW 106 communicates with the MME 104 via interface S11 and with the PGW 107 via the S5 interface. Further, the SGW may communicate with the NodeB 112 of the UMTS radio access network UTRAN 113 and with the GSM EDGE ("Enhanced Data rates for GSM Evolution") Radio Access Network (GERAN) via the S12 interface.

The MME 104 is responsible for idle mode UE tracking and paging procedure including retransmissions. It is involved in the bearer activation/deactivation process and is also responsible for choosing the SGW 106 for a UE 101 at the initial attach and at time of intra-LTE handover involving core network node relocation. It is responsible for authenticating the user by interacting with the Home Subscriber Server (HSS) 108. The Non-Access Stratum (NAS) signaling terminates at the MME 104 and it is also responsible for generation and allocation of temporary identities to UEs via the S1-MME interface. It checks the authorization of the UE 101 to camp on the service provider's Public Land Mobile Network (PLMN) and enforces UE roaming restrictions. The MME 104 is the termination point in the network for ciphering/integrity protection for NAS signaling and handles the security key management. Lawful interception of signaling is also supported by the MME. The MME 104 also provides the control plane function for mobility between LTE and 2G/3G access networks with the S3 interface terminating at the MME 104 from the Serving General Packet Radio Service (GPRS) Support Node (SGSN) 105. The MME 104 also terminates the S6a interface towards the home HSS 108 for roaming UEs 101. Further, there is an interface S10 configured for communication between MMEs for MME relocation and MME-to-MME information transfer.

The PGW 107 provides connectivity to the UE 101 to external packet data networks (PDNs) by being the point of exit and entry of traffic for the UE 101. A UE may have simultaneous connectivity with more than one PGW for accessing multiple PDNs. The PGW 107 performs policy enforcement, packet filtering for each user, charging support, lawful Interception and packet screening. Another key role of the PGW 107 is to act as the anchor for mobility between 3GPP and non-3GPP technologies such as WiMAX and 3GPP2 (CDMA 1x and EvDO). The interface between the PGW 107 and the packet data network, being for instance the Internet, is referred to as the SGi. The packet data network may be an operator external public or private packet data network or an intra operator packet data network, e.g. for provision of IP Multimedia Subsystem (IMS) services.

The PCRF 111 determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF 111 provides the PGW 107 with such rules and/or policies or similar to be used by the acting PGW 107 as a Policy and Charging Enforcement Function (PCEF) via interface Gx. The PCRF further communicates with the packet data network via the Rx interface.

The system 100 further comprises a 3GPP Authentication, Authorization and Accounting (AAA) server 114, which takes care of the authentication, authorization and accounting of the UE 101 connecting to the EPC network via an untrusted WLAN 103 and an Evolved Packet Data Gateway (ePDG) across interface SWm. The ePDG 118 further connects to the PGW 107 via interface S2B/GTP (both GPRS tunneling protocol (GTP) and Proxy Mobile IPv6 (PMIP) is possible). The 3GPP AAA server 114 also connects to the HSS 108 via interface SWx, to the PGW via interface S6b, and to an Access Control (AC)/TWAG 119 via interface STa. The AC/TWAG 119 provides a gateway for the UE 101 between the EPC network and trusted WLAN and further connects to the PGW via interface Sea/GTP. The UE 101 connects to the WLAN 103 via an access point (AP) 110.

Figure 2A:
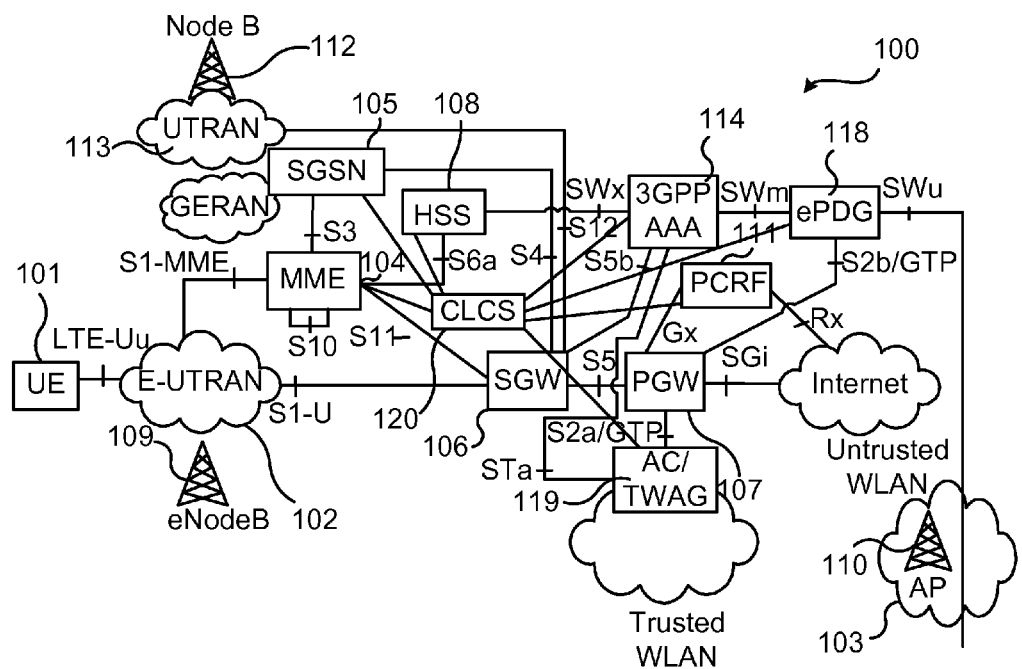
FIG. 2a shows the wireless communication system of FIG. 1 in which an intermediate network node of an embodiment of the present invention is implemented.

FIG. 2a illustrates the intermediate network node 120 of an embodiment of the present invention, referred to as a Central Location Control Server (CLCS), implemented in the wireless network 100 and advantageously connected to the mobility management nodes MME 104, SGSN 105, AC/TWAG 119, ePDG 118 as well as location data requesting nodes 3GPP AAA server 114, PCRF 111 and HSS 108.

Figure 2B:
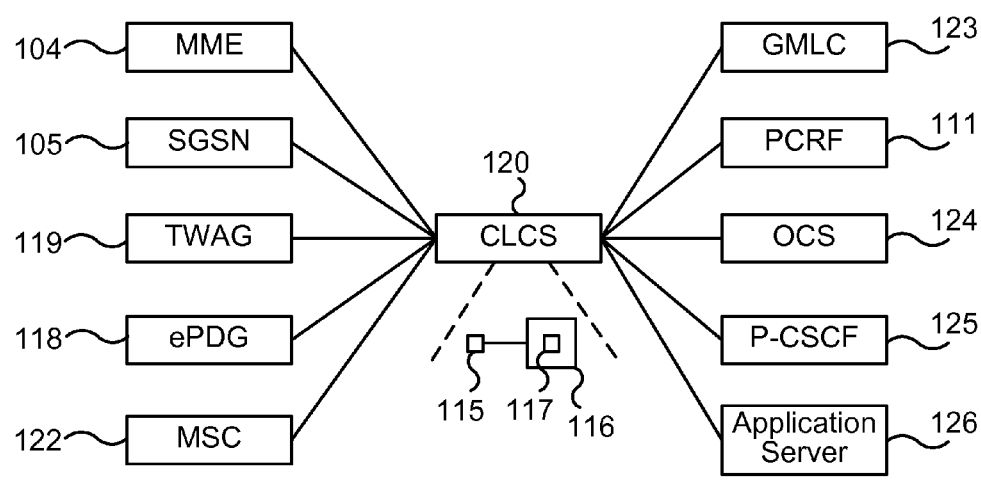
FIG. 2b shows the intermediate network node of an embodiment of the present invention connect to various mobility management nodes and location data requesting nodes.

FIG. 2b exemplifies a number of different mobility management nodes, such as an MME 104, an SGSN 105, a TWAG 119 an ePDG 118, an MSC 122, etc., to which the CLCS 120 may establish connections. Further, FIG. 2b exemplifies a number of different nodes potentially requesting UE location data, such as a GMLC 123, a PCRF 111, an OCS 124 a P-CSCF 125, an Application Server 126, etc., to which the CLCS 120 may establish connections.

Figure 2C:
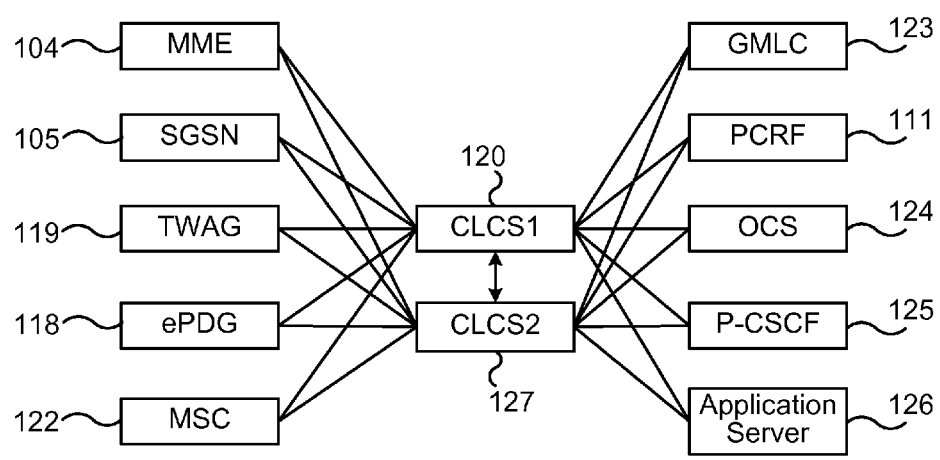
FIG. 2c shows a plurality of intermediate network nodes of an embodiment of the present invention connect to various mobility management nodes and location data requesting nodes.

With further reference to FIG. 2b, the method at the CLCS 120, of managing UE location data is performed by a processing unit 115 embodied in the form of one or more microprocessors arranged to execute a computer program 117 downloaded to a suitable storage medium 116 associated with the microprocessor, such as a Random Access Memory (RAM), a Flash memory or a hard disk drive. Thus, as is illustrated by means of dashed lines in FIG. 2b, the processing unit 115 and the storage medium are included in the UE 101. The processing unit 115 is arranged to carry out the method according to embodiments of the present invention when the appropriate computer program 117 comprising computer-executable instructions is downloaded to the storage medium 116 and executed by the processing unit 115. The storage medium 116 may also be a computer program product comprising the computer program 117. Alternatively, the computer program 117 may be transferred to the storage medium 16 by means of a suitable computer program product, such as a Digital Versatile Disc (DVD) or a memory stick. As a further alternative, the computer program 117 may be downloaded to the storage medium 116 over a network. The processing unit 115 may alternatively be embodied in the form of a digital signal processor 3o (DSP), an application specific integrated circuit (ASIC), a field-programmable gate array (FPGA), a complex programmable logic device (CPLD), etc. FIG. 2C shows a further embodiment of the present invention where a plurality of CLCSs, in this case a first CLCS 120 and a second CLCS 127, are included in a wireless communication system. In a practical deployment, there may be situations where one CLCS is not sufficient for serving all nodes. In case a number of CLCSs are used, requested UE location data can be shared among the CLCSs 120, 127, e.g. when the PCRF 111 requests the location information for a certain UE, the first CLCS 120 could have some routing function to re-direct the request to the second CLCS 127. Further, different CLCSs could handle different UEs. Moreover, it is possible that the first CLCS 120 fetches all location information stored in the mobility management node 104, and keeps relevant UE location information to itself, while distributing other sets of UE location data to the second CLCS 127.

Figure 3:
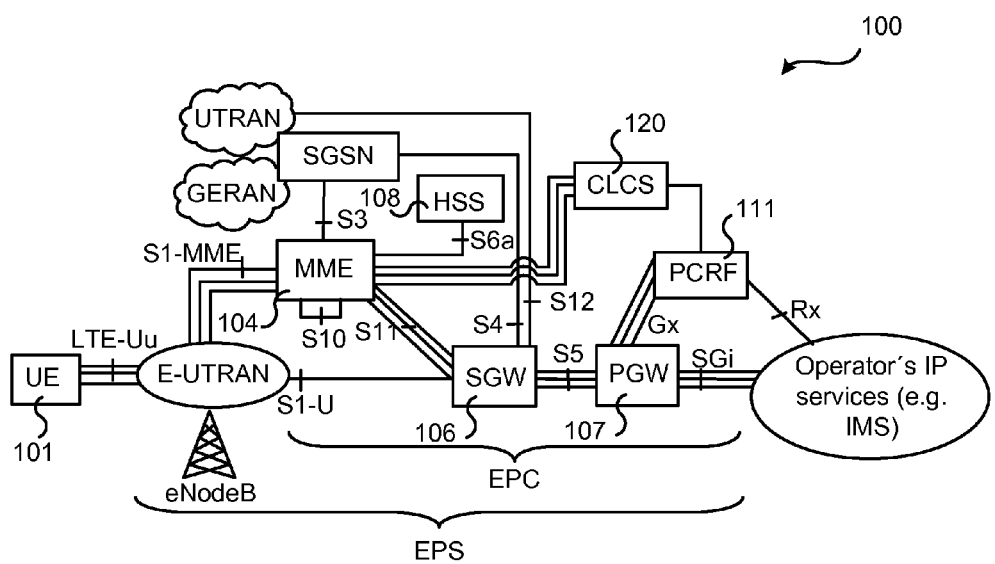
FIG. 3 illustrates the wireless communications system of FIG. 2a with a reduced number of network nodes.

FIG. 3 further illustrates a wireless communications network too where some of the entities of FIG. 2a have been omitted for brevity. However, it should be noted that the communication network typically comprises far more entities than what is shown in FIG. 3. In an embodiment of the present invention, assuming that the UE 101 for instance has a number of PDN connections established (three in FIG. 3) with the EPC network to the PDN via the SGi interface, the PCRF 111 requesting location data will have one signalling relation per PDN connection with the UE 101 via the MME 104, the SGW 106 and the PGW 107. However, with the present invention, the CLCS 120 connects to the MME 104 and the PCRF 111, thus advantageously providing one signaling relation per UE from the CLCS 120 to the PCRF lit, while the CLCS 120 may have several signaling connections per UE 101 to the MME 104, e.g. one signaling connection per PDN connection that has been established for the UE 101, e.g. three (3) PDN connections as indicated in FIG. 3.

Figure 4:
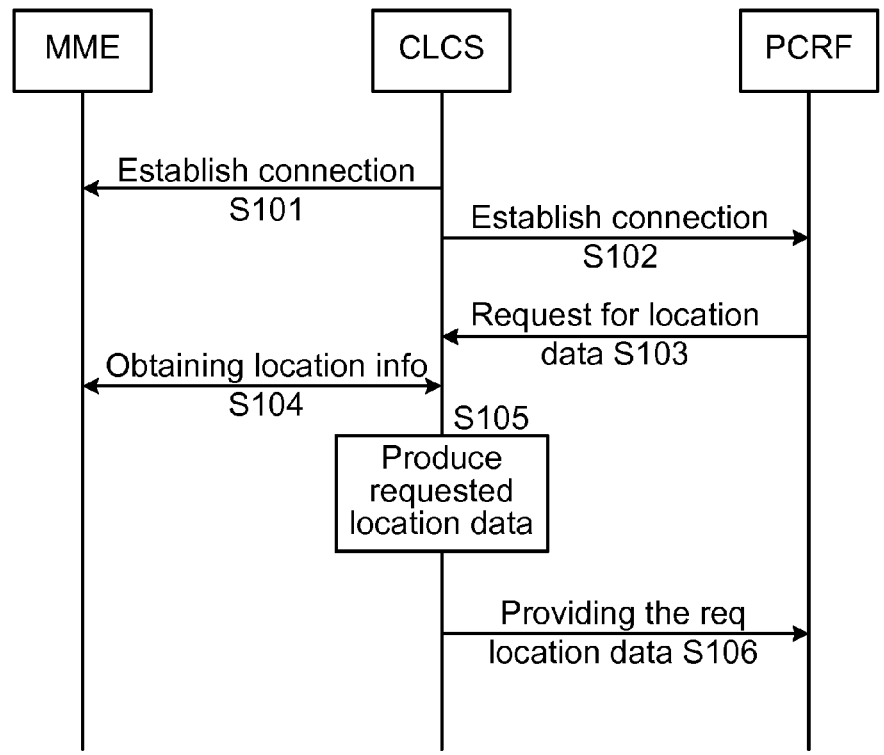
FIG. 4 shows a signalling diagram illustrating an embodiment of the present invention.

FIG. 4 illustrates a signalling diagram to which reference further is made. As mentioned, the CLCS 120 establishes a connection with the MME 104 in step S101 for receiving location information indicating the location of one or more UEs 101, and further a connection with the PCRF 111 in step S102 for providing location data indicating the location of at least one UE 101. When the PCRF 111 makes a request for location data indicating the location of the UE 101, the PCRF 111 submits the request directly to the CLCS 120 in step S103. The request may be made for instance for billing purposes; e.g. it can be envisaged that a user has one lower billing rate when establishing a PDN connection from her home and another higher billing rate when the PDN connection is established from outside her home. Upon receiving the request from the PCRF 111, the CLCS 120 turns in step S104 to the MME 104 for obtaining a set of location information indicating the location of the UE 101. In this particular exemplifying embodiment, the set of location information obtained comprises location information of the UE 101 for each respective one of the three established PDN connections being input to the CLCS 120 from the MME 104, e.g. as indicated in FIG. 3. From the obtained set of location information pertaining to the respective PDN connection of the UE 101, the CLCS 120 produces in step S105 the requested location data. In this embodiment of the present invention, the set of location information obtained by the CLCS 120 from the MME 104 comprises three subsets of information each indicating the location of the UE (one subset or piece of information for each PDN connection established for the UE 101 as illustrated in FIG. 3), and the requested location data is produced by merging the three subsets together into a single piece of location data for the UE 101 constituting the requested location data. The requested location data is finally provided by the CLCS 120 to the PCRF 111 in step S106. Advantageously, by having the CLCS 120 managing the UE location data, the traffic over the path formed by the MME 104, the SGW 106, the PGW 107 and the PCRF 111 (which path typically already is loaded in terms of traffic) is greatly reduced since the transfer of UE location data in the present invention is effected via the path formed by the MME 104, the CLCS 120 and the PCRF 111.

In addition, as indicated above, it is preferred that the CLCS 120 produces a single piece of location data for the UE and provides the single piece of location data to the PCRF—i.e. not the set of location information comprising three (3) subsets of information each indicating the location for the UE 101. This has the advantage of reducing the traffic from the CLCS 120 to the requesting PCRF in. In embodiments of the present invention, this applies mutatis mutandis to step S105 in FIGS. 6 and 8 to be discussed below.

It should be noted that unless the CLCS 120 is aware of which MME the UE 101 is served by, the CLCS 120 will in embodiments of the present invention turn to the HSS 108 with a query accordingly, e.g. the CLCS 120 may in some embodiments be configured to request information from the HSS 108 indicating the MME that serves the UE in question.

Further, in step S104 where location information of the UE 101 is obtained, either a push or pull approach can be used. Thus, the MME 104 can be the initiator of the information transfer and "push" the location information onto the CLCS 120. Conversely, the CLCS 120 may initiate the transfer and hence "pull" the location information from the MME 104. In embodiments of the present invention, this applies mutatis mutandis to steps S104a, S104b in FIGS. 6 and 8 to be discussed below.

Regarding the pull-push approach used between a mobility management node such as the MME 104 and the CLCS 120, if the pull approach is used, all location info can be stored in the MME 104, so that the CLCS 120 can fetch it whenever needed. If the pull approach is used, for a specific UE, the CLCS 120 can query the HSS 108 to receive information regarding which MME is currently serving a particular UE. The CLCS 120 thus requests information indicating the location of a UE from the MME 104 (and exactly which information should be reported back from the MME 104).

In case a push approach is used, it can even be envisaged that the MME 104 is configured to push location data for each particular UE controlled by the MME 104 onto the CLCS 120. In a further example, the CLCS 120 may instruct the MME 104 to report a particular UE event, such as if the UE enters a particular PRA during a given time period, for instance between 8 PM and 8 AM. Thus, the CLCS 120 may itself determine level of UE location data reporting, as long as the requesting node is provided with the required UE information.

When applying the push-pull approach between the CLCS 120 and any one of the UE location data requesting nodes, such as e.g. the PCRF in, the pull approach typically implies that the PCRF in sends an explicit location query for certain UE to the CLCS 120, and subsequently receives a report accordingly.

In yet a further embodiment of the present invention, the CLCS 120 implements rules controlling what to report and when to report to the requesting nodes. These rules may be preconfigured at the CLCS 120, or received from a requesting node, which as a consequence can subscribe to desired UE location data reports. For instance, the PCRF 111 may subscribe to a certain event, e.g. for receiving a notification when a UE enters a particular PRA, for continuously receiving notifications for any UE location change, or for receiving certain UE location data during a given time period. The CLCS 120 will thus push any such subscribed information onto the PCRF 111. In an embodiment of the present invention, the CLCS 120 has already obtained the location information from the MME 104 when the PCRF 111 requests UE location data, e.g. requests the data as discussed above with reference to step S103. The CLCS 120 would in this embodiment advantageously have a proxy-like functionality, where location data commonly requested by the PCRF 111 may be gathered in advance at the CLCS 120. Hence, the steps of the method as described in the signaling diagram of FIG. 4 may be performed in a different order. For example, the obtaining step S104 may be performed before the requesting step S103. In embodiments of the present invention this applies mutatis mutandis to the obtaining step S104*a* in FIG. 6 and S104*a*, S104*b* in FIG. 8 that may be performed before the requesting step S103 in FIG. 6 and S103*a*, S103*b* in FIG. 8 respectively. Similarly, step S103 of requesting location data may follow after step S105, where the location information is pre-fetched. In embodiments of the present invention this applies mutatis mutandis to requesting step S103 in FIG. 6, S103*a* and S103*b* in FIG. 8 that may follow after the producing step S105 in FIGS. 6 and 8 respectively.

Figure 5:
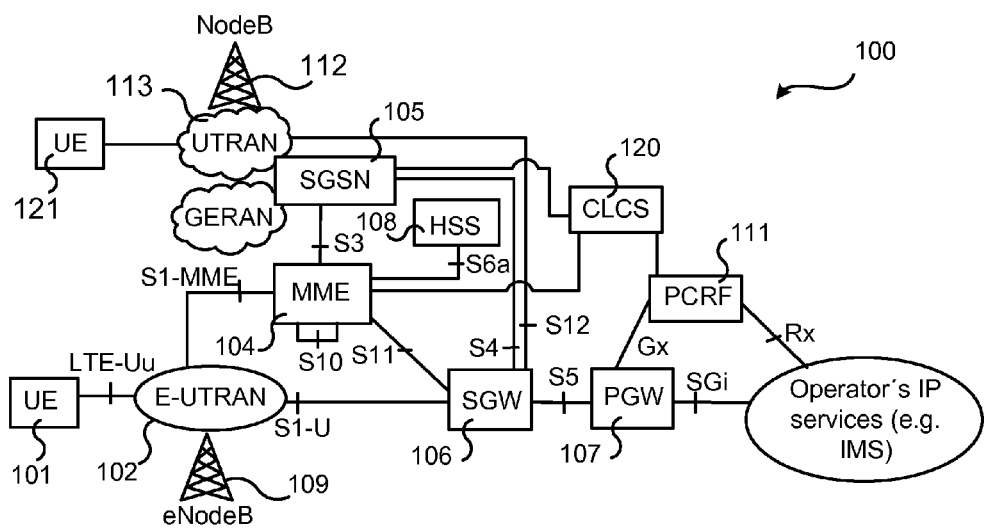
FIG. 5 illustrates a further embodiment of the intermediate network node according to the present invention.

FIG. 5 illustrates a further embodiment of the CLCS 120 implemented in the wireless communications network 100, but where the PCRF 111 requests in which respective area/cell a first UE 101 and a second UE 121 are located. Thus, in this particular embodiment, the CLCS establishes a connection with several mobility management nodes in the form of the MME 104 and the SGSN 105. For instance, the PCRF 111 may request information regarding in which Presence Reporting Area or similar area the UE 101 is located. The Presence Reporting Area concept as defined within the 3GPP enables the PCRF 111 (or any other requester) to define an arbitrary area for which the SGSN/MME shall report UE entrances and exits.

Figure 6:
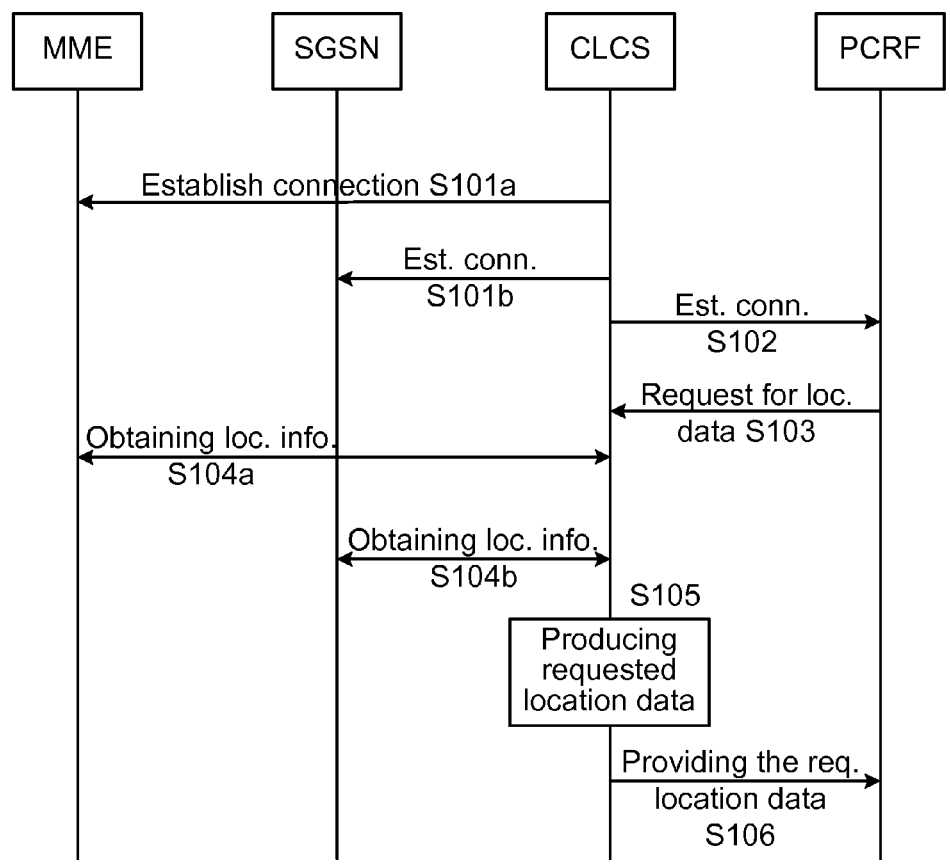
FIG. 6 shows a signalling diagram illustrating a further embodiment of the present invention.

FIG. 6 illustrates a signalling diagram to which reference further is made. The CLCS 120 establishes a connection with the MME 104 in step S101*a* for receiving location information indicating the location of one or more UE 101, a connection with the SGSN 105 in step S101*b* for receiving location information indicating the location of one or more UE 121, and further a connection with the PCRF 111 in step S102 for providing location data indicating the location of at least one UE 101, 121. The MME 104 connects with the first UE 101 via the eNodeB 1 in the E-UTRAN 102 while the SGSN 105 connects with the second UE 121 via the NodeB 112 in the UTRAN 113. When the PCRF 111 makes a request for location data indicating the location of the first UE 101 and the second UE 121, the PCRF 111 again submits the request directly to the CLCS 120 in step S103. However, in this particular embodiment, the request contains a request for location data of the first UE 101 as well as for the second UE 121, and there is accordingly no need to pass via the SGW 106 and the SGW 107 and on to the MME 104 via interface S11 and the SGSN 105 via interface S4. Further, in the art, the PCRF would have to form two separate requests, i.e. one for the MME and one for the SGSN, potentially having different formats and content. With the CLCS 102 of the present embodiment, the potential burden of forming the different requests are completely put on the CLCS 120. The request may be made for instance for resource purposes; it can be envisaged that a user of the first UE 101 is located in an area where it is necessary to provide a higher Quality of Service (QoS), while a user of the second UE 121 is in an area where a lower QoS is provided. Upon receiving the request from the PCRF 111, the CLCS 120 turns in step S104*a* to the MME 104 for obtaining a set of location information indicating the location of the first UE 101. Further, the CLCS 120 turns in step S104*b* to the SGSN 105 for obtaining a set of location information indicating the location of the second UE 121. From the obtained set of location information pertaining to the first and second UE 101, 121, respectively, the CLCS 120 produces in step S105 the requested location data. In an embodiment of the present invention, the set of location information obtained by the CLCS 120 from the MME 104 and the SGSN 105 comprises two subsets (one for each UE as illustrated in FIG. 5), and the requested location data is produced by concatenating the two subsets together into a single piece of data constituting the requested location data. The requested location data is finally provided by the CLCS 120 to the PCRF 111 in step S106. Advantageously, by having the CLCS 120 managing the UE location data, the traffic over the paths formed by the MME 104/SGSN 105, the SGW 106, the PGW 107 and the PCRF 111 is greatly reduced since the transfer of UE location data in the present invention is effected via the paths formed by the MME 104/SGSN 105, the CLCS 120 and the PCRF 111.

It should further be noted that if e.g. the first UE 101 would be moved to another MME or the SGSN 105, that movement would advantageously not affect the reporting interface of the PCRF 111. As indicated above when discussing FIG. 4, the CLCS 120 may in some embodiments be configured to request from the HSS 108 information indicating the MME or SGSN that serves UE, should the CLCS be unaware of the MME or SGSN that serves a certain UE.

Figure 7:
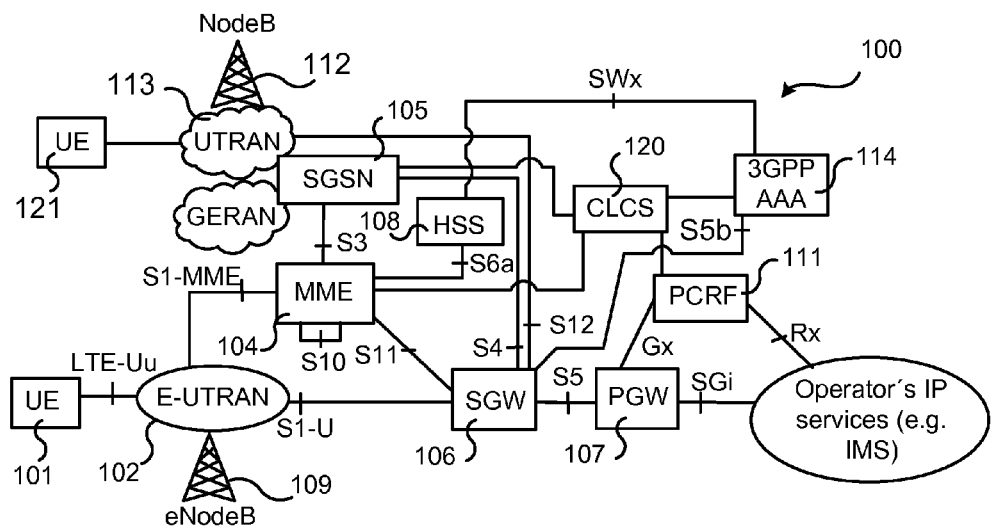
FIG. 7 illustrates yet a further embodiment of the intermediate network node according to the present invention.

FIG. 7 illustrates a further embodiment of the CLCS 120 implemented in the wireless communications network 100, but where the PCRF 111 requests in which respective area/cell the first UE 101 and the 3GPP AAA server requests in which respective area/cell the second UE 121 are located. Thus, in this particular embodiment, the CLCS establishes a connection with several mobility management nodes in the form of the MME 104 and the SGSN 105 and several location data requesting nodes in the form of the PCRF 111 and the 3GPP AAA server 114. The CLCS may be configured to establish a connection with one or more than one mobility management node such as the MME 104 or the SGSN 105 or similar and with any one of several different location data requesting nodes such as the PCRF 111 or the 3GPP AAA server 114 or similar.

Figure 8:
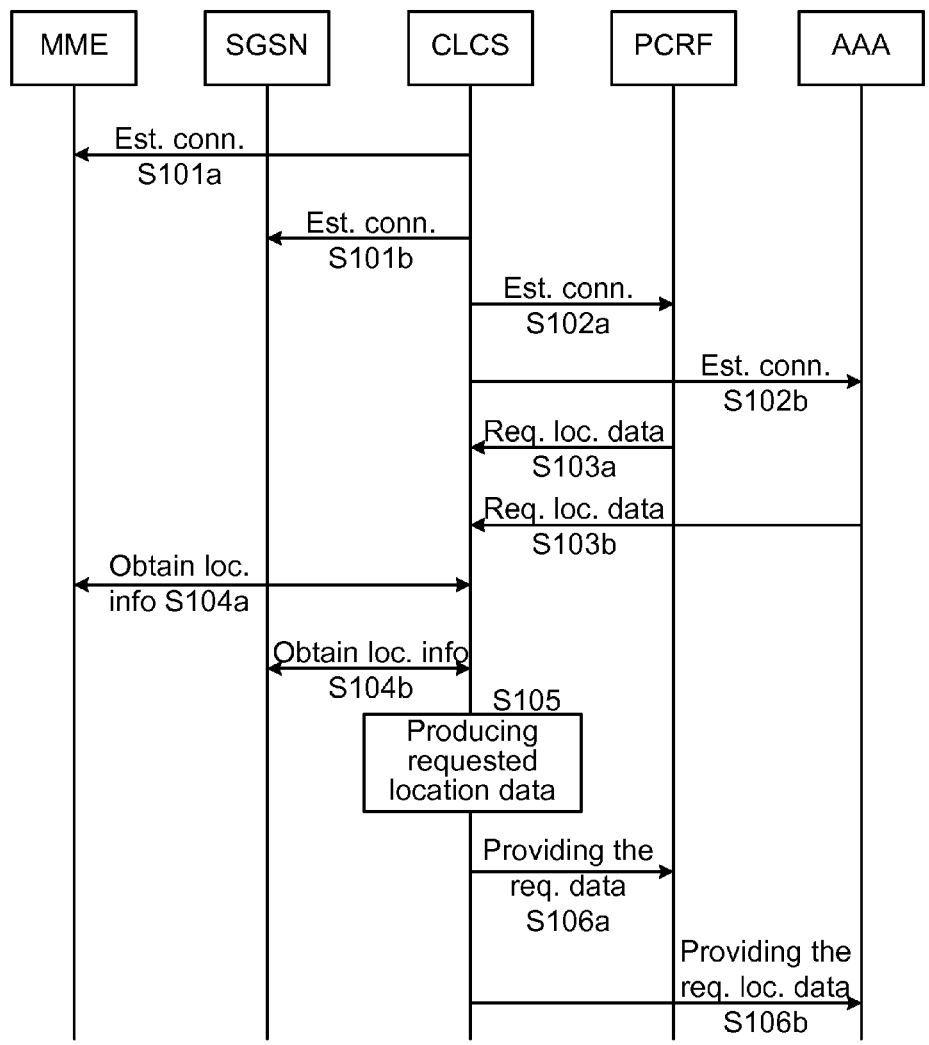
FIG. 8 shows a signalling diagram illustrating still a further embodiment of the present invention.

FIG. 8 illustrates a signalling diagram to which reference further is made. The CLCS 120 establishes a connection with the MME 104 in step S101*a* for receiving location information indicating the location of one or more UE 101, a connection with the SGSN 105 in step S101*b* for receiving location information indicating the location of one or more UE 121, a connection with the PCRF 111 in step S102*a* for providing location data indicating the location of at least one UE 101, 121, and a further connection with the 3GPP AAA server 114 in step S102*b* for providing location data indicating the location of at least one UE 101, 121. The MME 104 connects with the first UE 101 via the eNodeB 109 in the E-UTRAN 102 while the SGSN 105 connects with the second UE 121 via the NodeB 112 in the UTRAN 113. When the PCRF 111 makes a request for location data indicating the location of the first UE 101, the PCRF 111 submits the request directly to the CLCS 120 in step S103*a*, and the 3GPP AAA server 114 makes a request for location data indicating the location of the second UE 121 by submitting the request directly to the CLCS 120 in step S103*b*. Again, there is no need to pass any additional nodes.

Upon receiving the request from the PCRF 111, the CLCS 120 turns in step S104a to the MME 104 for obtaining a set of location information indicating the location of the first UE 101.

Further, the CLCS 120 turns in step S104b to the SGSN 105 for obtaining a set of location information indicating the location of the second UE 121. From the obtained set of location information pertaining to the first and second UE 101, 121 received from the MME 104 and the SGSN 105, respectively, the CLCS 120 produces in step S105 the requested location data. The requested location data is produced from the obtained location information in step S105 and submitted in step S106a to the PCRF 111 (regarding the first UE 101) and submitted in step S106b to the 3GPP AAA server 114 (regarding the second UE 121).

It should further be noted that location information pertaining to one or more UEs 101, 121 can be stored permanently or temporarily at the CLCS 120. Thus, the CLCS 120 advantageously provides a central storage of UE location data to which any network node requesting UE location data can turn.

Figure 9:
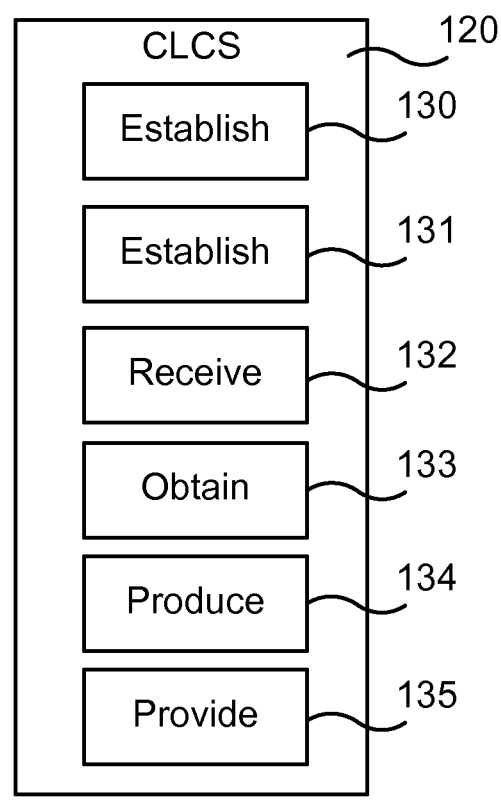
FIG. 9 illustrates still a further embodiment of the intermediate network node according to the present invention.

FIG. 9 shows an intermediate network node 120 configured to manage location data of mobile terminals 101, 121 in a wireless communication network according to an embodiment of the present invention. The network node 120 comprises establishing means 130, 131 adapted to establish connection with one or more mobility management nodes and any one of network nodes requesting location data indicating the location of at least one mobile terminal, respectively, receiving means 132 adapted to receive a request for the location data indicating the location of the at least one mobile terminal from a requesting network node of the network nodes, and obtaining means 133 adapted to obtain a set of location information indicating the location of the at least one mobile terminal from at least one of the mobility management nodes. The intermediate network node 120 further comprises producing means 134 adapted to produce the requested location data from the obtained set of location information, and providing means 135 adapted to provide the produced location data to the requesting network node of said network nodes. The network node 120 may further comprise a local storage for storing obtained data. The various means 130-135 may (in analogy with the description given in connection to FIG. 2b) be implemented by a processor embodied in the form of one or more microprocessors arranged to execute a computer program downloaded to a suitable storage medium associated with the microprocessor, such as a RAM, a Flash memory or a hard disk drive. The various means 130-135 may further comprise one or more transmitters and/or receivers and/or transceivers, comprising analogue and digital components and a suitable number of antennae for radio communication.

Some embodiments described above may be summarized in the following manner:

One embodiment is directed to an intermediate network node configured to manage location data of mobile terminals in a wireless communication network. The intermediate network node comprises a processing unit and a memory, said memory containing instructions executable by said processing unit, whereby said network node is operative to:

establish connection with one or more mobility management nodes in the network;

establish connection with any one of network nodes requesting location data indicating the location of at least one mobile terminal;

receive a request for the location data indicating the location of the at least one mobile terminal from a requesting network node of said network nodes;

obtain a set of location information indicating the location of the at least one mobile terminal from at least one of the mobility management nodes;

produce the requested location data from the obtained set of location information;

provide the produced location data to the requesting network node of said network nodes.

The intermediate network node may be further operative to:

obtain the set of location information pertaining to a plurality of Packet Data Network, PDN, connections established for the at least one mobile terminal with the communication network; and produce the requested location data by merging the obtained location information pertaining to each of the PDN connections into a single piece of location data for the mobile terminal.

The intermediate network node may further be, when establishing connection with one or more mobility management node, operative to:

establish connection with a first mobility management node; and establish connection with a second mobility management node; and wherein the intermediate network node further is, when obtaining a set of location information, configured to:

obtain a set of location information indicating the location of the at least one mobile terminal from the first mobility management node; and obtain a set of location information indicating the location of the at least one mobile terminal from the second mobility management nodes.

The set of location information indicating the location of the at least one mobile terminal obtained from the first mobility management node may pertain to a first mobile terminal, and the set of location information indicating the location of the at least one mobile terminal obtained from the second mobility management node may pertain to a second mobile terminal.

The intermediate network node may, when establishing connection with any one of network nodes requesting location data, be operative to:

establish connection with a first requesting node; and establish connection with a second requesting node; and wherein the intermediate network node may be further, when receiving a request for the location data, configured to:

receive a request for the location data indicating the location of the at least one mobile terminal from the first requesting node; and receive a request for the location data indicating the location of the at least one mobile terminal from the second requesting node.

The intermediate network node may be further operative to:

send a query to a Home Subscriber Server, HSS, regarding from which one or more mobility management nodes the set of location information indicating the location of the at least one mobile terminal should be obtained.

The set of location information may indicate in which Presence Reporting Area, PRA, the at least one mobile terminal is located.

The intermediate network node may be further operative to:

store the obtained the set of location information indicating the location of the at least one mobile terminal for subsequent provision to one or more mobility management nodes in the network.

The intermediate network node may be further operative to:
establish connection with any one of at least two different network nodes in a set of network nodes comprising a HSS, a Policy and Charging Rules Function, PCRF, an Authentication, Authorization and Accounting, AAA, server, an application server, a Gateway Mobile Location Center, GMLC, an Online Charging System, OCS, a Proxy-Call Session Control Function, P-CSCF.

The intermediate network node may be further operative to:
establish connection with two or more different mobility management nodes in a set of mobility management nodes comprising a Serving Gateway, SGW, a Packet Data Network Gateway, PGW, a Serving General Packet Service Support Node, SGSN, a Gateway General Packet Service Support Node, GGSN, a Trusted Wireless Access Gateway, TWAG, an Evolved Packet Data Gateway, ePDG, a Mobile Switching Center, MSC.

The intermediate network node may be further operative to:
receive a subscription for notification of an event related to the location of at least one mobile terminal; and
provide the requesting network node subscribing to the event with the location data indicating the location of the at least one mobile terminal upon occurrence of said event.

A plurality of intermediate network nodes may be configured to share data pertaining to mobile terminal location among each other.

Another embodiment is directed to a method at an intermediate network node of managing location data of mobile terminals in a wireless communication network. The method comprises:
establishing connection with one or more mobility management nodes in the network;
establishing connection with any one of network nodes requesting location data indicating the location of at least one mobile terminal;
receiving a request for the location data indicating the location of the at least one mobile terminal from a requesting network node of said network nodes;
obtaining a set of location information indicating the location of the at least one mobile terminal from at least one of the mobility management nodes;
producing the requested location data from the obtained set of location information;
providing the produced location data to the requesting network node of said network nodes.

The method may further comprise:
obtaining the set of location information pertaining to a plurality of Packet Data Network, PDN, connections established for the at least one mobile terminal with the communication network; and
producing the requested location data by merging the obtained location information pertaining to each of the PDN connections into a single piece of location data for the mobile terminal.

The method may further, when establishing connection with one or more mobility management node, comprise:
establishing connection with a first mobility management node; and
establishing connection with a second mobility management node; and, when obtaining a set of location information:
obtaining a set of location information indicating the location of the at least one mobile terminal from the first mobility management node; and
obtaining a set of location information indicating the location of the at least one mobile terminal from the second mobility management nodes.

The set of location information indicating the location of the at least one mobile terminal obtained from the first mobility management node may pertain to a first mobile terminal, and the set of location information indicating the location of the at least one mobile terminal obtained from the second mobility management node may pertain to a second mobile terminal.

17. The method may further, when establishing connection with any one of network nodes requesting location data, comprise:
establishing connection with a first requesting node; and
establishing connection with a second requesting node; and further, when receiving a request for the location data, comprise:
receiving a request for the location data indicating the location of the at least one mobile terminal from the first requesting node; and
receiving a request for the location data indicating the location of the at least one mobile terminal from the second requesting node.

18. The method of any one of claims 13-17, further comprising:
sending a query to a Home Subscriber Server (108), HSS, regarding from which one or more mobility management nodes (104, ion) the set of location information indicating the location of the at least one mobile terminal (101) should be obtained.

The set of location information may indicate in which Presence Reporting Area, PRA, the at least one mobile terminal is located.

The method may further comprise:
storing the obtained the set of location information indicating the location of the at least one mobile terminal for subsequent provision to one or more mobility management nodes in the network.

The method may further comprise:
establishing connection with any one of at least two different network nodes in a set of network nodes comprising a HSS, a Policy and Charging Rules Function, PCRF, an Authentication, Authorization and Accounting, AAA, server, an application server, a Gateway Mobile Location Center, GMLC, an Online Charging System, OCS, a Proxy-Call Session Control Function, P-CSCF.

The method may further comprise:
establishing connection with two or more different mobility management nodes in a set of mobility management nodes comprising a Serving Gateway, SGW, a Packet Data Network Gateway, PGW, a Serving General Packet Service Support Node, SGSN, a Gateway General Packet Service Support Node, GGSN, a Trusted Wireless Access Gateway, TWAG, an Evolved Packet Data Gateway, ePDG, a Mobile Switching Center, MSC.

The method may further comprise:
receiving a subscription for notification of an event related to the location of at least one mobile terminal; and
providing the requesting network node subscribing to the event with the location data indicating the location of the at least one mobile terminal upon occurrence of said event.

Another embodiment is directed to a computer program comprising computer-executable instructions for causing a network node to perform the steps recited in any one of claims 1-12 when the computer-executable instructions are executed on a processing unit included in the network node.

Another embodiment is directed to a computer program product comprising a computer readable medium, the computer readable medium having the computer program according to claim 24 embodied therein.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An intermediate network node configured to manage location data of mobile terminals in a wireless communication network, the intermediate network node comprising a processing unit and a memory, said memory containing instructions executable by said processing unit, whereby said network node is operative to:
  establish connection with one or more mobility management nodes in the network, wherein, when establishing the connection with one or more mobility management nodes, said network node is operative to:
  establish connection with a first mobility management node; and
  establish connection with a second mobility management node;
  establish connection with any one of network nodes requesting location data indicating a location of at least one mobile terminal;
  receive a request for the location data indicating the location of the at least one mobile terminal from a requesting network node of said network nodes;
  obtain a set of location information indicating the location of the at least one mobile terminal from at least one of the mobility management nodes, wherein the intermediate network node further is, when obtaining a set of location information, configured to:
  obtain a set of location information indicating the location of the at least one mobile terminal from the first mobility management node; and
  obtain a set of location information indicating the location of the at least one mobile terminal from the second mobility management nodes where the obtained set of location information indicating the location of the at least one mobile terminal from the first mobility management node pertains to a first mobile terminal, and the obtained set of location information indicating the location of the at least one mobile terminal from the second mobility management node pertains to a second mobile terminal;
  produce the requested location data from the obtained set of location information; and
  provide the produced location data to the requesting network node of said network nodes.

2. The intermediate network node of claim 1, wherein the set of location information pertains to a plurality of Packet Data Network, PDN, connections established for the at least one mobile terminal with the communication network and the intermediate network node is further operative to
produce the requested location data by merging the obtained location information pertaining to each of the PDN connections into a single piece of location data for the mobile terminal.

3. The intermediate network node of claim 1, further being operative to:
send a query to a Home Subscriber Server, HSS, regarding from which one or more mobility management nodes the set of location information indicating the location of the at least one mobile terminal should be obtained.

4. The intermediate network node of claim 1, the set of location information indicating in which Presence Reporting Area, PRA, the at least one mobile terminal is located.

5. The intermediate network node of claim 1, further being operative to:
store the obtained set of location information indicating the location of the at least one mobile terminal for subsequent provision to the one or more mobility management nodes in the network.

6. The intermediate network node of claim 1, further being operative to:
establish connection with any one of at least two different network nodes in a set of network nodes comprising a Home Subscriber Server, HSS, a Policy and Charging Rules Function, PCRF, an Authentication, Authorization and Accounting, AAA, server, an application server, a Gateway Mobile Location Center, GMLC, an Online Charging System, OCS, and a Proxy-Call Session Control Function, P-CSCF.

7. The intermediate network node of claim 1, further being operative to:
establish connection with two or more different mobility management nodes in a set of mobility management nodes comprising a Serving Gateway, SGW, a Packet Data Network Gateway, PGW, a Serving General Packet Service Support Node, SGSN, a Gateway General Packet Service Support Node, GGSN, a Trusted Wireless Access Gateway TWAG, an Evolved Packet Data Gateway, ePDG, and a Mobile Switching Center, MSC.

8. The intermediate network node of claim 1, further being operative to:
receive a subscription for notification of an event related to the location of at least one mobile terminal; and
provide the requesting network node subscribing to the event with the location data indicating the location of the at least one mobile terminal upon occurrence of said event.

9. The plurality of intermediate network nodes of claim 1, said plurality of intermediate network nodes being configured to share data pertaining to mobile terminal location among each other.

10. An intermediate network node configured to manage location data of mobile terminals in a wireless communication network, the intermediate network node comprising a processing unit and a memory, said memory containing instructions executable by said processing unit, whereby said network node is operative to:
  establish connection with one or more mobility management nodes in the network;
  establish connection with any one of network nodes requesting location data indicating a location of at least one mobile terminal, wherein the intermediate network node is, when establishing the connection with any one of network nodes requesting location data, operative to:
  establish connection with a first requesting node; and
  establish connection with a second requesting node;
  receive a request for the location data indicating the location of the at least one mobile terminal from a requesting network node of said network nodes, wherein the intermediate network node further is, when receiving a request for the location data, configured to:
  receive a request for the location data indicating the location of the at least one mobile terminal from the first requesting node; and receive a request for the location data indicating the location of the at least one mobile terminal from the second requesting node;
obtain a set of location information indicating the location of the at least one mobile terminal from at least one of the mobility management nodes;
produce the requested location data from the obtained set of location information; and
provide the produced location data to the requesting network node of said network nodes.

11. A method at an intermediate network node of managing location data of mobile terminals in a wireless communication network, comprising:
establishing connection with one or more mobility management nodes in the network, wherein establishing the connection with one or more mobility management nodes includes:
establishing a connection with a first mobility management node; and
establishing a connection with a second mobility management node;
establishing connection with any one of network nodes requesting location data indicating the location of at least one mobile terminal;
receiving a request for the location data indicating the location of the at least one mobile terminal from a requesting network node of said network nodes;
obtaining a set of location information indicating the location of the at least one mobile terminal from at least one of the mobility management nodes, wherein obtaining a set of location information includes:
obtaining a set of location information indicating the location of the at least one mobile terminal from the first mobility management node; and
obtaining a set of location information indicating the location of the at least one mobile terminal from the second mobility management nodes where the obtained set of location information indicating the location of the at least one mobile terminal from the first mobility management node pertains to a first mobile terminal, and the obtained set of location information indicating the location of the at least one mobile terminal from the second mobility management node pertains to a second mobile terminal;
producing the requested location data from the obtained set of location information; and
providing the produced location data to the requesting network node of said network nodes.

12. The method of claim 11, wherein
the set of location information pertains to a plurality of Packet Data Network, PDN, connections established for the at least one mobile terminal with the communication network and the method further comprises
producing the requested location data by merging the obtained location information pertaining to each of the PDN connections into a single piece of location data for the mobile terminal.

13. The method of claim 11, further comprising:
sending a query to a Home Subscriber Server, HSS, regarding from which one or more mobility management nodes the set of location information indicating the location of the at least one mobile terminal should be obtained.

14. The method of claim 11, the set of location information indicating in which Presence Reporting Area, PRA, the at least one mobile terminal is located.

15. The method of claim 11, further comprising:
storing the obtained the set of location information indicating the location of the at least one mobile terminal for subsequent provision to the one or more mobility management nodes in the network.

16. The method of claim 11, further comprising:
establishing connection with any one of at least two different network nodes in a set of network nodes comprising a Home Subscriber Server, HSS, a Policy and Charging Rules Function, PCRF, an Authentication, Authorization and Accounting, AAA, server, an application server, a Gateway Mobile Location Center, GMLC, an Online Charging System, OCS, and a Proxy-Call Session Control Function, P-CSCF.

17. The method of claim 11, further comprising:
establishing connection with two or more different mobility management nodes in a set of mobility management nodes comprising a Serving Gateway, SGW, a Packet Data Network Gateway, PGW, a Serving General Packet Service Support Node, SGSN, a Gateway General Packet Service Support Node, GGSN, a Trusted Wireless Access Gateway, TWAG, an Evolved Packet Data Gateway, ePDG, and a Mobile Switching Center, MSC.

18. The method of claim 11, further comprising:
receiving a subscription for notification of an event related to the location of at least one mobile terminal; and
providing the requesting network node subscribing to the event with the location data indicating the location of the at least one mobile terminal upon occurrence of said event.

19. A method at an intermediate network node of managing location data of mobile terminals in a wireless communication network, comprising:
establishing connection with one or more mobility management nodes in the network;
establishing connection with any one of network nodes requesting location data indicating the location of at least one mobile terminal, wherein when establishing connection with any one of network nodes requesting location data, the method further comprises:
establishing connection with a first requesting node; and
establishing connection with a second requesting node;
receiving a request for the location data indicating the location of the at least one mobile terminal from a requesting network node of said network nodes, wherein, when receiving a request for the location data, comprising:
receiving a request for the location data indicating the location of the at least one mobile terminal from the first requesting node; and
receiving a request for the location data indicating the location of the at least one mobile terminal from the second requesting node; and
obtaining a set of location information indicating the location of the at least one mobile terminal from at least one of the mobility management nodes;
producing the requested location data from the obtained set of location information; and
providing the produced location data to the requesting network node of said network nodes.

* * * * *